Aug. 9, 1960 K. McILWAIN 2,948,886
CODE-SETTING DEVICE
Filed Jan. 28, 1955 6 Sheets-Sheet 1

Aug. 9, 1960    K. McILWAIN    2,948,886
CODE-SETTING DEVICE
Filed Jan. 28, 1955    6 Sheets-Sheet 3
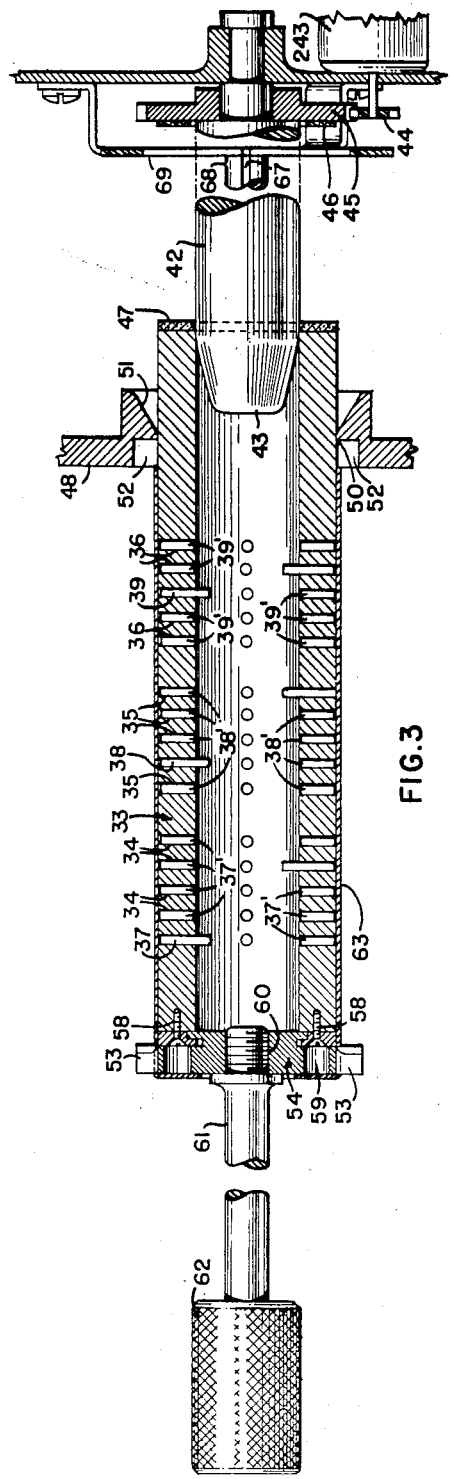

Aug. 9, 1960     K. McILWAIN     2,948,886
CODE-SETTING DEVICE

Filed Jan. 28, 1955     6 Sheets-Sheet 4

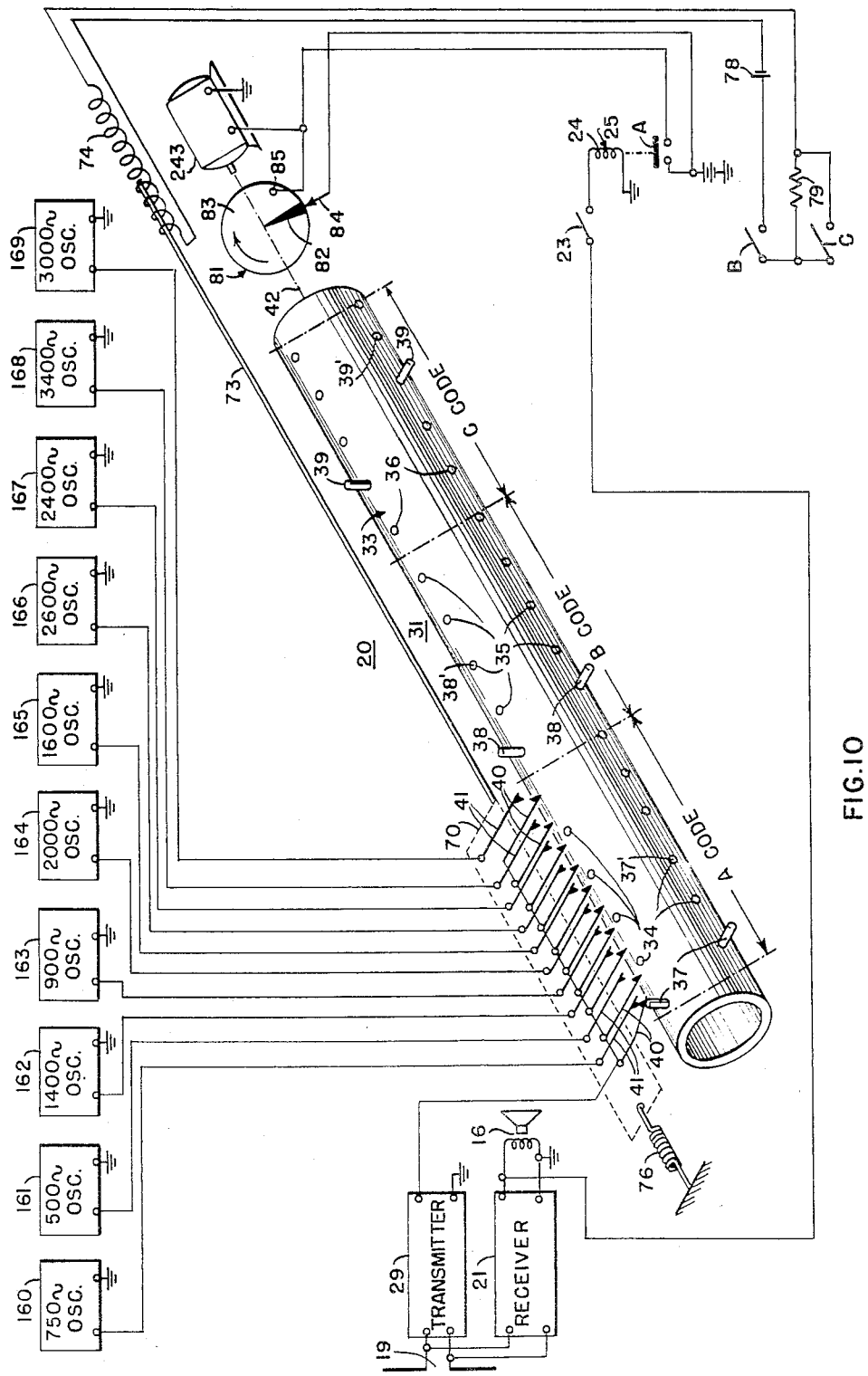

United States Patent Office 2,948,886
Patented Aug. 9, 1960

2,948,886

CODE-SETTING DEVICE

Knox McIlwain, Huntington, N.Y., assignor to Hazeltine Research, Inc., Chicago, Ill., a corporation of Illinois Filed Jan. 28, 1955, Ser. No. 484,612

19 Claims. (Cl. 340—345)

*General*

The present invention is directed to code-setting devices and, more particularly, to code-setting devices for use with secrecy communication and identification systems. While such devices have a variety of applications, they have particular utility in a system for identifying moving aircraft such as that disclosed and claimed in applicant's copending application Serial No. 484,657, filed concurrently herewith, entitled "Identification System" and, hence, will be described in that connection.

The substantial increase in the number of domestic aircraft, both commercial and private, and the large number of flights between nations and countries are making it important that it be possible speedily to identify aircraft flying within a country such as the United States and also any aircraft approaching its boundaries. The advent of atomic weapons and very high speed military aircraft having large cruising ranges and also unsettled world political conditions are making it particularly important that it be possible quickly to identify any aircraft approaching the perimeter of this country in order to determine whether it is a friendly craft or a hostile one.

Various proposals have been made to permit the recognition of incoming air traffic to the United States. One proposal is to assign at the time of take-off a code word and/or a specific maneuver to a pilot at the point of departure of his plane for the United States. In advance of this departure this code word and the maneuver are communicated ahead with the plane's flight plan to the port of entry in this country and to outlying stations such as patrol ships and lightships along the flight path of the aircraft. If the craft arrives approximately on schedule, the pilot is interrogated by the nearest outlying station which demands a reply in terms of the code word. If the proper reply is received, the aircraft is assumed to be friendly. If, however, there is any doubt as to the identity of the craft, the pilot thereof may be asked by the outlying station to execute his specified maneuver. If this is not done correctly, the outlying station immediately takes steps to issue a warning so that fighter planes may be dispatched to that region to check on the identity and mission of the challenged aircraft.

The system of identification just described is recognized as being rather cumbersome and insecure. Furthermore, it is effective to verify the identity of only a few aircraft of the very large number being naviagted in or about the country. For example, no attempt is made to dientify planes whose flights originate in this country since these planes are assumed to be friendly. Thus, in a situation which demands a complete and reliable check as to the identity of aircraft flying about the perimeter of this country, it might be necessary to ground all friendly planes in that area. Obviously this procedure is economically undesirable.

To compensate partly for some of the short-comings of an identification system of the type mentioned above, a network consisting of a large number of ground stations manned by volunteer civilian personnel who act as "aircraft spotters" has been established. In general, these individuals rely largely upon their unaided senses of hearing and sight to spot aircraft within the perimeter of the country in an effort to determine whether such craft are friendly or unfriendly. In addition to requiring large numbers of trained personnel working in shifts to provide a continuous watch, this supplement to an identification system is limited in its effectiveness by weather conditions and darkness. Furthermore, such a spotting program primarily serves only to identify unfriendly craft which have already deeply and dangerously penetrated the perimeter of this country. It would be desirable to have a secure yet relatively simple identification system which is effective to expand its protective perimeter well beyond the geographic limits of this country.

The identification system disclosed and claimed in applicant's copending application Serial No. 484,657, filed concurrently herewith, entitled "Identification System" is directed to a new and improved system for identifying movable objects and avoids one or more of the abovementioned disadvantages and limitations of prior such systems. That system discloses a coding apparatus, for use in an aircraft which is being interrogated to transmit information that indicates whether the aircraft is friendly or not, that generates any selected one or ones of a multiplicity of tone signals which are utilized to modulate the carrier-frequency reply signal. These tone signals are representative of the identity of the aircraft which is being interrogated, it being proposed that each friendly aircraft from time to time be assigned three secret coded reply signals which, for security reasons, are known only to proper defense authorities in a territory such as the United States but are not known to the aircraft personnel. A first of these coded signals is a predetermined or selected one of a multiplicity of code combinations and such a coded reply is required of every interrogated aircraft within the range of the interrogator. The second and third coded reply signals are also selected ones of a multiplicity of code combinations and are supplied by the interrogated aircraft only upon demand by an interrograting station such as one in a zone about the protective perimeter of the territory. One or more of such interrogations ordinarily would be made only of aircraft flying toward or across the aforesaid zone from another territory or country or when some doubt or suspicion exists as to the identity of an aircraft. The second and third coded reply signals are selected ones of a multiplicity of code combinations and, when received in response to successive interrogations following a first interrogation, serve fully to identify the interrogated aircraft. A multiplicity of code combinations are desirable not only to identify a large number of aircraft but also because a plurality of sets of such code combinations make it extremely difficult for an unfriendly aircraft fortuitously or through premeditation to duplicate the code.

From the standpoint of cost it is desirable that a code-setting device for use in the coding apparatus of an aircraft-identifying system of the type under consideration be relatively simple in construction and yet capable of conditioning the coding apparatus to develop any selected one or ones of a multiplicity of code combinations. Furthermore, since security is paramount, it is important that the selected code or codes for designating individual aircraft be known to a very limited number of trusted personnel. To the end of reducing the number of such personnel, it would seem advantageous that the pilot and other operating personnel of an aircraft have no knowledge whatever of the code assigned for a particular flight or flights especially where the aircraft flies across the protective perimeter of a territory from a foreign territory. Since the code to be employed is established by a code-setting device, the latter, prior to being placed in the responder or replying unit in an aircraft, should not reveal the code, thus making it difficult or virtually impossible to copy the code and turn this information over to an unauthorized individual or agent of a hostile nation. Once the code-setting device is in the coding apparatus of the responder in the aircraft, the code-setting device should be effective when required accurately to establish the proper code or codes upon request by the interrogator.

It is an object of the invention, therefore, to provide a new and improved code-setting device which is relatively simple in construction and inexpensive to manufacture.

It is another object of the invention to provide a new and improved code-setting device which is not only simple in construction but also is capable of establishing a selected one or ones of a multiplicity of code combinations.

It is a further object of the invention to provide a new and improved code-setting device which affords a high degree of security.

It is an additional object of the invention to provide a code-setting device which does not reveal the code to be established thereby by a visual inspection.

It is another object of the invention to provide a new and improved code-setting device which is capable of reuse wherein it can set up a multiplicity of new and different code combinations.

In accordance with the invention, a code-setting device for an electrical identification system comprises a drum having a plurality of approximately radially disposed apertures extending through the wall thereof and arranged in a predetermined pattern, and at least one member adapted to be confined by frictional surface engagement in any one of the aforesaid apertures selected in accordance with a predetermined code, the aforesaid member having a length greater than the thickness of the above-mentioned wall and a width throughout the aforesaid length substantially equal to the width of any one of the apertures.

Also in accordance with the invention, a code-setting device for an electrical identification system comprises a drum having a plurality of approximately radially disposed apertures extending through the wall thereof and arranged in a predetermined pattern. The device further includes at least one member adapted to be confined by frictional surface engagement in any one of the aforesaid apertures selected in accordance with a predetermined code, that member having a length greater than the thickness of the aforesaid wall and a width throughout the aforesaid length substantially equal to the width of any one of the apertures with one end of the aforesaid member lying in an inoperative position below the outer surface of the drum and the other end thereof extending beyond the inner surface of the drum. The device further includes means shaped for insertion axially within the drum into engagement with the aforesaid other end of the aforesaid member to displace the one end thereof beyond the outer surface of the drum into an operative position.

Further in accordance with the invention, there is provided in a code-setting device a drum having a plurality of approximately radially disposed apertures extending through the wall thereof and arranged in a predetermined pattern.

For a better understanding of the present invention, together with other and further objects thereof, reference is had to the following description taken in connection with the accompanying drawings, and its scope will be pointed out in the appended claims.

Referring to the drawings:

Fig. 3 is a longitudinal sectional view but in greater detail of a portion of a code-setting device of the present invention;

Fig. 4 is an enlarged end view of a fragmentary portion of the device of Fig. 3;

Fig. 5 is an elevational view, partly in section, of another portion of the code-setting device;

Fig. 10 is a schematic representation of a wave-signal transponder for utilizing a code-setting device in accordance with the invention for replying to interrogations of the beacon of Fig. 9.

Figure 1:
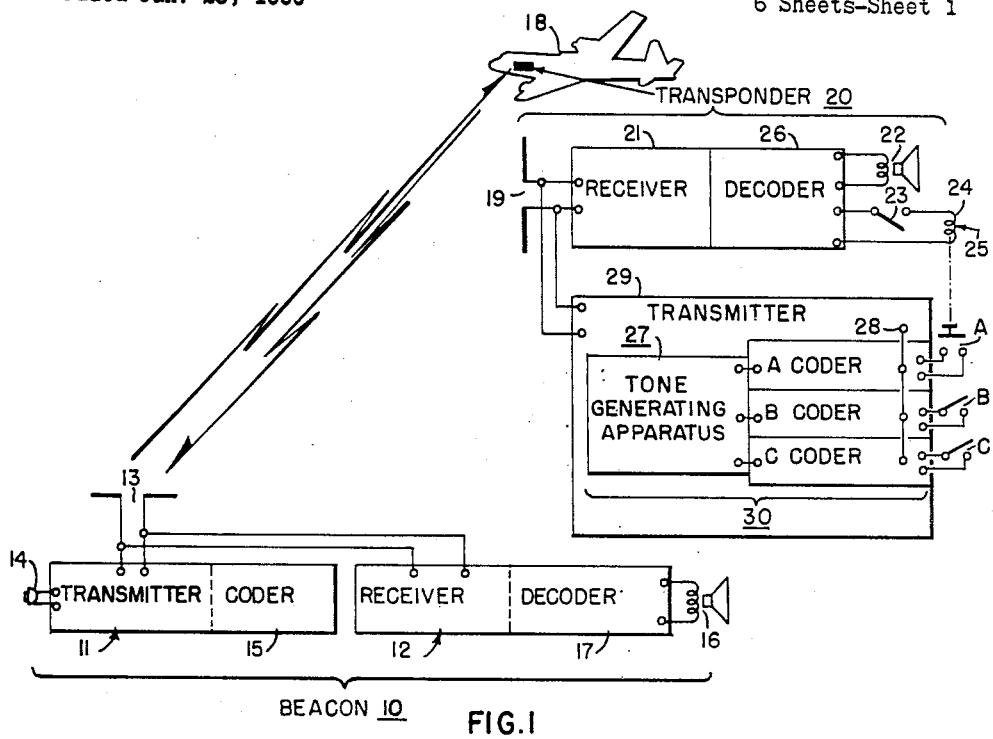
Fig. 1 represents schematically a complete wave-signal identification system for utilizing a code-setting device in accordance with a particular form of the invention.

*Description of identification system of Fig. 1*

Referring now more particularly to Fig. 1 of the drawings, the identification system there represented comprises a first wave-signal station or beacon 10 which may be terrestrially located or may be mounted on a suitable object such as a patrol ship or lightship in the protective perimeter of a territory. This station preferably includes means such as a transmitter 11 for transmitting wave-signal interrogations and a receiver 12 for receiving wave-signal replies from a distant object such as an aircraft in response to those interrogations. The transmitter and the receiver are provided with a suitable antenna system represented for convenience as a common antenna system 13 although it will be apparent that separate antenna systems may be employed if desired. The transmitter 11 is provided with suitable means for modulating the carrier-frequency wave signal radiated by the transmitter, this means being represented as a microphone 14, although, if desired, a coder 15 of suitable construction may be employed in lieu thereof to develop modulation signals in accordance with a suitable code or codes for application to the transmitter. The receiver 12 includes suitable means 16 for providing an indication of the received wave-signal replies and, for convenience of illustration and ease of understanding, this means has been represented as a loudspeaker. It will be understood that, alternatively, the indicating means 16 may comprise a suitable display system for providing a visual indication of the reply signals received in response to an interrogation by the transmitter 11. It will also be understood that the receiver 12 may include a suitable decoder 17 when the indicating means 16 requires a decoding of the received signal prior to utilization thereby.

The identification system of Fig. 1 also includes a second wave-signal station 20 which is movable relative to the first station or beacon 10. This second station preferably comprises a transponder which is mounted on an aircraft 18 and includes a receiver 21 which is responsive to the interrogations from the first station 10 for developing a control effect therefrom. When a voice-modulated interrogating wave signal is transmitted to the receiver 21, this control effect is the audio-frequency signal developed in its output circuit for application to a utilizing device such as a loudspeaker 22. Alternatively, this control effect may be applied through a manually operated switch 23 to the winding 24 of a relay 25 which controls a normally open but manually closable switch A to be referred to again subsequently. When a coded transmission is employed between the first station 10 and the second station 20, the receiver 21 includes a decoder 26 which is coupled to the utilizing device of the receiver.

The second wave-signal station 20 includes a circuit or source for supplying a plurality of signal components, specifically, a plurality of audio-frequency or tone signals in accordance with one embodiment of the invention. This circuit is represented more fully in Fig. 2 of the drawings and comprises a signal-generating apparatus 27 including a plurality of oscillators 28'–32', inclusive, which develop, respectively, tone signals having frequencies such as 750, 1400, 2000, 2600, and 3400 cycles. It will be understood that these frequencies are merely illustrative and that other frequencies such as supersonic frequencies may be employed for some applications. The tone-signal generating apparatus 27 is coupled to each of three coders A, B, and C represented in Fig. 1 in a manner which will be described more fully subsequently in connection with Fig. 2 of the drawings. The tone-signal generating apparatus 27 in combination with the coders A, B, and C comprises a coding apparatus 30 for the transponder 20. As represented in Fig. 1, the coders B and C are provided with suitable manually operated switches B and C. The coders A, B, and C have a common signal-translating channel comprising a circuit including a conductor 28 coupled between each coder and a reply transmitter 29 which is coupled to an antenna system 19 common to the receiver 21 and the transmitter. Separate antenna systems may be employed if desired. The transmitter 29 preferably is arranged to house the tone-signal generator 27 and the three coders.

*Description of code-setting device of Figs. 2–7*

Figure 2:
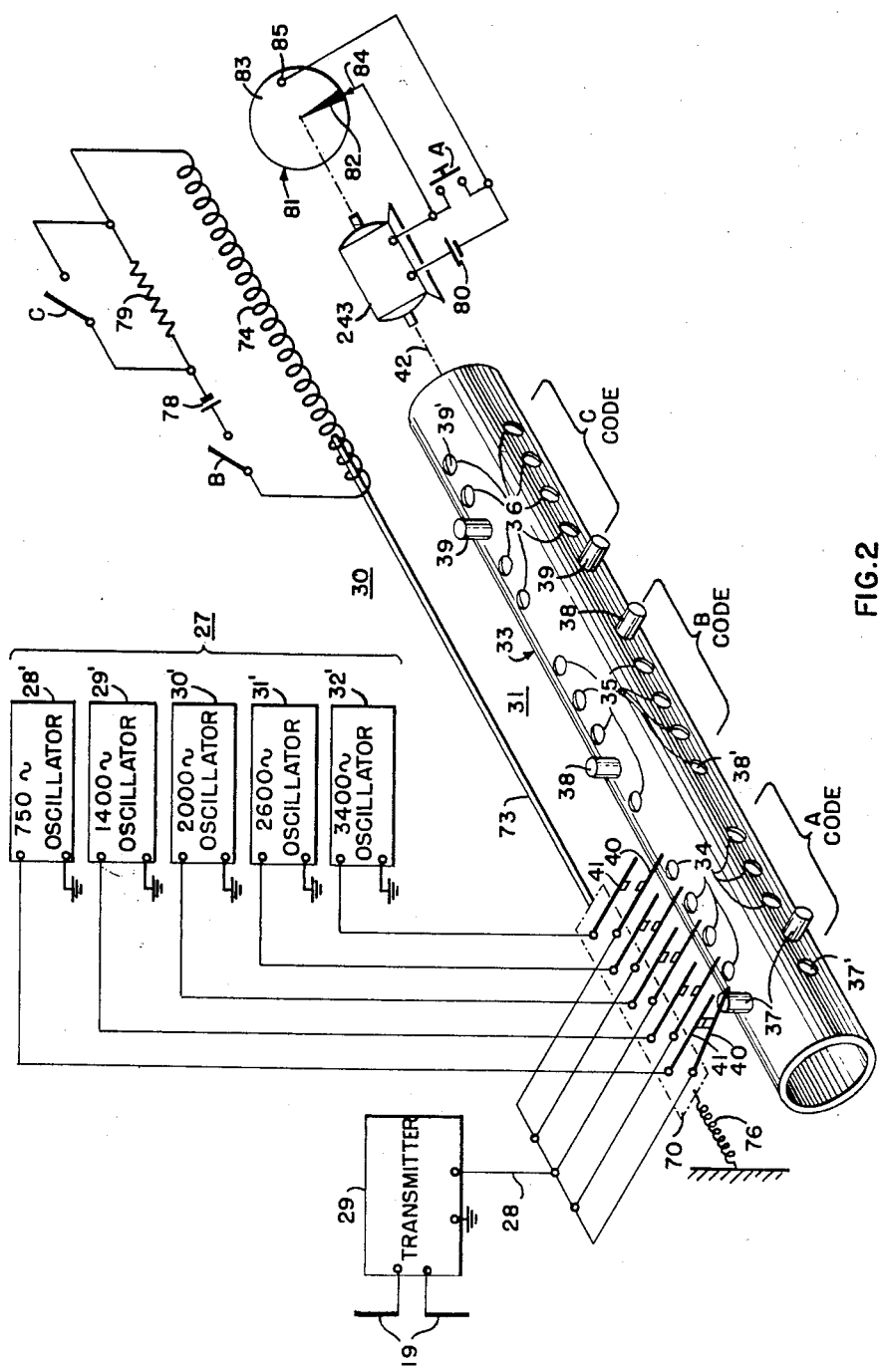
Fig. 2 represents schematically one form of a wave-signal reply transmitter including a particular form of code-setting device in accordance with the present invention for the identification system of Fig. 1.

Referring now more particularly to Fig. 2 of the drawings, the coding apparatus 30 of the identification system also comprises means including the signal-translating channel 28 and a code-setting device 31 which includes a drum 33 having one portion thereof coupled between the aforesaid channel and the tone-generating apparatus 27 and operative in response to the control effect developed in the output circuit of the receiver 21 for translating over the channel 28 selected ones of the components in a predetermined relation. The drum 33 has at least two portions. For the purposes under consideration, it has three portions which in Fig. 2 bear the legends A code, B code, and C code. The drum 33 is made of a suitable material, such as brass, and includes a plurality of approximately radially disposed apertures 34, 34, 35, 35, and 36, 36 extending through the wall of the drum and arranged in accordance with a predetermined pattern or patterns. For the particular embodiment of the invention presently under consideration, the apertures just mentioned are arranged in three similar patterns, one for each of the different codes. Each pattern consists of four longitudinal rows of apertures disposed in quadrature relation, only two rows of which are visible in the Fig. 2 representation of each pattern. Each row contains five apertures as shown.

The code-setting device 31 also includes at least three members in the form of cylindrical electrical contact actuating pins which are adapted to be confined by a snug fit in any one of the apertures of each of the three patterns, which apertures are selected in accordance with a predetermined code established by authorities in charge of aircraft scurity. To this end, the A code includes at least one pin 37 which may be of insulating material, the B code includes at least another such pin 38, and the C code includes a third such pin 39, although several pins may be employed, as represented in Fig. 2 of the drawings, for establishing the selected A, B, and C codes. These pins have a length which is greater than the thickness of the wall of the drum with one end of the pins initially conditioned to be in an inoperative position below the outer surface of the drum while the other end extends beyond the inner surface of the drum as represented in Fig. 3. The pins 37, 38, and 39 are frictionally retained in an established position in their respective apertures but may be displaced outwardly along the axes of those apertures to positions as represented in Fig. 2 by a suitable force exerted radially of the drum in a manner to be explained subsequently. The pins are adapted firmly and frictionally to be retained in the apertures even though they have been displaced outwardly as just mentioned.

The drum 33 preferably contains a second plurality of pins 37', 38', and 39' (see Fig. 3) which are similar to the pins 37, 38, and 39 but have a length equal to the thickness of the drum. These pins are confined in those apertures not containing the longer pins for a purpose which will be made clear hereinafter. For some applications the pins 37', 38', and 39' may be omitted although for security reasons it is more desirable to use them.

Figure 6:
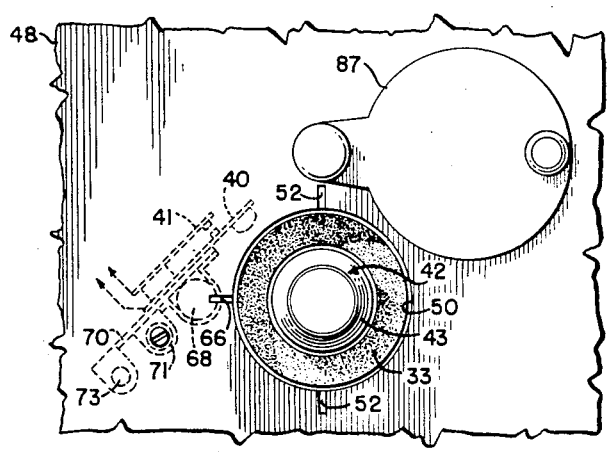
Fig. 6 is a front elevational view of an additional portion of the code-setting device.

Fig. 2 represents diagrammatically the drum 33 of the code-setting device 31 in its operative position with reference to the other members of the code-setting apparatus 30. Details of the code-setting device 31 and its drum, however, are illustrated in Fig. 3 and will now be described. The code-setting device includes means for insertion axially of the drum into engagement with the inner ends of any of pins 37, 37, 38, 38, and 39, 39 which may be confined in their corresponding apertures to position or push the outer ends of these pins beyond the outer surface of the drum into an operative position for selective engagement with the lower fingers 40, 40 of individual sets of electrical contact fingers 40, 40 and 41, 41 as represented in Fig. 2. The insertion means comprises a rotatable cylindrical spindle 42 having a tapered free end 43 which serves to make a cam-type engagement with the pins 37, 38, and 39 so as to exert a radial force thereon which cams the pins outwardly so that they extend beyond the outer surface of the drum 33 when the latter is pushed over the spindle 42. The pins 37', 38', and 39' are unaffected by the spindle 42 and its tapered end 43. The spindle 42 is driven by a motor 243 through suitable gears 44 and 45. The latter may be provided with a frictional driving disc 46 for frictional engagement with a similar disc 47 on one end of the drum 33, although frictional engagement between the pins 37, 38, and 39 and the spindle 42 is ordinarily enough to rotate the drum. The motor 243 may be provided with a conventional dynamic braking arrangement for preventing overrunning of the motor when the energizing current thereof is removed. A suitable dynamic braking arrangement is disclosed in Patent 2,474,576, granted June 28, 1949, to Nicholas V. Fedotoff. The spindle 42 and the driving mechanism 243, 44, and 45 are mounted within a metallic housing 48 a portion of which is shown in Fig. 3. This housing preferably constitutes the cabinet for the interrogator-responser apparatus 20, represented in Fig. 1, only the front panel of which is represented in Figs. 3 and 6.

The housing 48 is provided with a circular aperture 50 having a diameter which is substantially that of the outer diameter of the drum 33 so as to permit the latter to be inserted in the housing. A pivoted cover 87 is attached to the front panel of the housing 48 and is employed to cover the aperture 50 and to retain the drum in a fixed position on the spindle 42. If desired, a suitable locking device (not shown) may be employed for locking the cover 87 in the position wherein it seals the aperture 50 and prevents unauthorized removal of the drum 33. To the rear of the aperture 50 is a tapered circular cam shoulder 51 for engagement with pins 37, 37, 38, 38, and 39, 39 when they project from the outer surface of the drum in a manner to be explained subsequently. Two slots 52, 52, shown in Figs. 3 and 6, extend radially outwardly from the aperture 50 and are adapted to receive a pair of cutters 53, 53 rotatably secured to the end of the drum opposite the friction disc 47. The cutters are part of a closure 54 for one end of the drum. The closure is provided with an annular groove 55 which is more clearly represented in the enlarged view of Fig. 4. The groove 55 is adapted to receive the annular flange 56 of a bipartite ring 57 which is secured to the drum by means of screws 58, 58. Access to the screws is had by means of a pair of apertures 59, 59 in the closure 54. The latter contains a threaded bore 60 for receiving the threaded end of an operating rod 61 having a knurled handle 62 which is employed for inserting the drum 33 over the spindle 42 within the housing 48.

Figure 7:
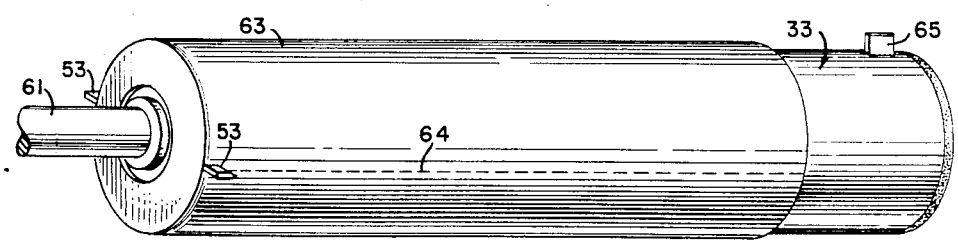
Fig. 7 is a perspective view of a portion of the code-setting device of Fig. 3 rotated through an angle of 90°.

A removable protective jacket of suitable stiff, opaque material, such as plastic or a relatively weak metal, is rather snugly secured in a suitable manner over most of the outer periphery of the drum 33 (see also Fig. 7). The jacket 63 is affixed to the drum after security authorities have caused the code-setting pins to be inserted in the various apertures in the drum 33 in accordance with the prescribed code for the particular aircraft which will utilize the drum in its transponder. The jacket may be attached by a suitable forming, molding, or extruding operation so that it makes a rather snug frictional engagement with the drum so that it cannot be removed from the drum except by a sliding and severing operation to be described hereinafter. The thickness of the jacket and the type of material thereof are selected so that when the drum is oriented, as represented in Fig. 3, and a steady axial thrust in the direction of the spindle 42 is exerted on the handle 62, one end of the jacket engages the housing at the aperture 50 and pushes or slides the jacket 63 rearwardly against the cutters 53, 53 so that it is effectively severed from the drum. If desired, the jacket may include a pair of weakened lines 64, 64 in the cutting region as represented in Fig. 7.

The drum 33 has at one end a lug 65 for alignment with a notch 66 (see Figs. 5 and 6) in the front panel of the housing 48. This lug is also adapted freely to ride in an elongated groove 67 (see Fig. 5) in a rod 68 suitably secured at one end of the housing 48 and at its other end to a bracket 69 secured to the rear wall of the housing. The lug 65 and the groove 67 serve to align the proper one of four horizontal space-quadrature rows of projecting pins on the drum 33 with a set of five lower electrical contact fingers 40, 40 (see Figs. 2 and 6) which may be deflected by any projecting pins on the drum into recurrent engagement with individual ones of an upper set of electrical contact fingers 41, 41 when the drum is rotated. The electrical contact fingers are secured in space-insulated relation to a support 70 which is slidably mounted on the rod 68 and also on another rod 71 as represented in Fig. 5. The support 70 and the contact fingers thereon serve as a movable distributor as will be made clear hereinafter. The support 70 carries a lug 72 (see Fig. 5) which, in turn, supports a rod 73 of magnetic material having one end which normally extends axially a short distance within a solenoid 74. The solenoid is suitably mounted on the housing as by a bracket 75. A coil spring 76 envelops the rod 73 and has its ends abutting the brackets 72 and 75 so as normally to maintain the support 70 in the positions represented in Figs. 2 and 5. It will now be apparent that the representation in Fig. 2 of the support 70, the spring 76, the rod 73, the solenoid 74, and the rotary spindle 42 is somewhat diagrammatic. The solenoid 74 is energized, as represented in Fig. 2, by a circuit including a switch B, an energizing source represented as a battery 78, and a resistor 79 having a switch C connected in shunt therewith. Individual oscillators of the signal-generating apparatus 27 are connected in a conventional manner to individual ones of the upper electrictl contact members 41, 41. The motor 243 is energized through a push-button switch A by a suitable source represented as a battery 80. A disc 81 is also rotatably driven by the motor 243 and comprises a narrow insulating segment 82 and a large adjoining conductive segment 83. Suitable contact means 84 and 85 are arranged to engage the disc and, in turn, are connected across the terminals of the switch A.

The second wave-signal translating station or transponder 20 of the identification system further includes means for electively and subsequently translating over the signal-translating channel 28 to the transmitter 29 selected ones of the tone signals developed by the oscillators 28'–32', inclusive, in a predetermined relation which may be different from that established by the pins 37, 37 in the apertures 34, 34 of the portion of the drum 33 devoted to the development of the A code. This developing means comprises the B code portion of the drum 33 and its associated apertures 35, 35 and pins 38, 38 together with solenoid 74, rod 73, switch B, battery 78, and resistor 79 which are effective to displace the support 70 to the right so that its contact fingers make engagement with the pins in the B code section of the drum.

The second wave-signal station or transponder 20 of the identification system additionally includes means including a third portion of the code-setting device 31, namely the C code portion of the drum 33, for electively and subsequently translating over the channel 28 to the transmitter 29 selected ones of the tone signals generated by the oscillators 28'–32', inclusive, in a predetermined relation which may be different from the first- and second-mentioned relations, namely, those relations established by the A and B code portions of the drum 33. This means includes the solenoid-energizing circuit and the switch C for shunting the resistor 79 so that the solenoid is energized to an extent sufficient to pull the support 70 and its contact fingers into operative relation with the C code section of the drum 33. As previously mentioned, the receiver 12 and the loudspeaker 16 of the beacon 10 of Fig. 1 comprise means for receiving the coded wave-signal replies from the transponder 20 and for providing an indication thereof.

*Operation of Fig. 1 identification system including code-setting device of Figs. 2–7*

Figure 8:
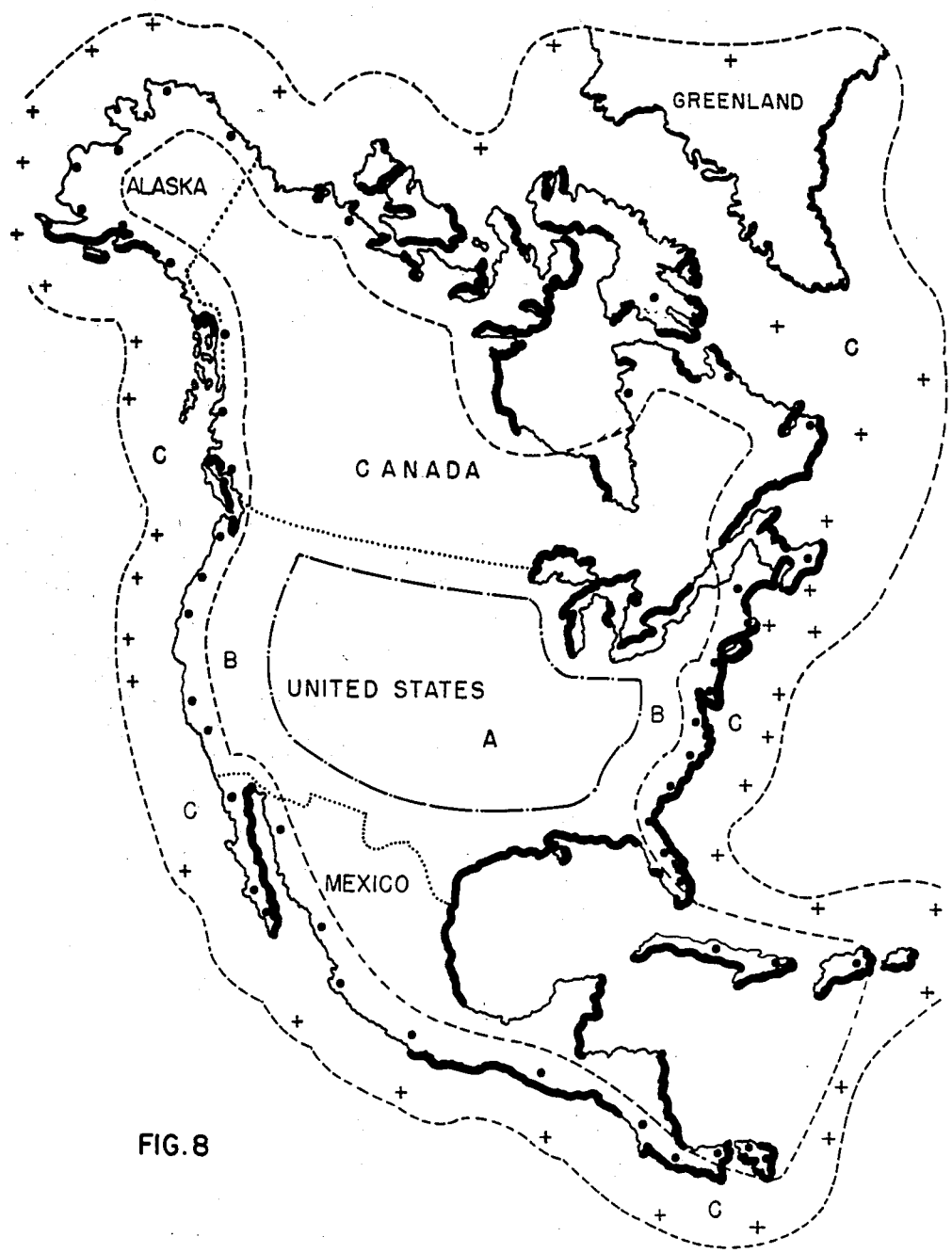
Fig. 8 is a map useful in explaining the operation of the system of Fig. 1.

Prior to considering the operation of the identification system of Fig. 1, it will be assumed that a plurality of the first wave-signal stations or beacons 10 are disposed at strategic locations in a protective perimeter or zone about North America, which perimeter includes the region within the broken-line boundaries represented in Fig. 8 of the drawings. It will be seen that this region includes not only land but also sea areas. Such beacons may be terrestrially located at suitable points such as those represented by the small dots or may be carried by military patrol craft such as aircraft or by seagoing vessels or other patrol craft such as lightships or iceberg patrol boats, which craft are represented in Fig. 8 by the small crosses. It will also be assumed that the second wave-signal station or transponder 20 is to be a friendly aircraft about to make a flight from England to the United States. The flight schedule of this aircraft has been communicated ahead to the proper authorities in the United States and to various of the first wave-signal stations such as the terrestrially located beacons and patrol craft along the flight path to be followed from England to a point in the United States such as New York.

Just prior to the moment of departure of the aircraft from an airport in England, an authorized representative of the United States Government proceeds to insert into the aperture 50 in the housing of the transponder 20 in the aircraft a coding drum 33 which has its pins inserted in certain of the apertures thereof in accordance with the prescribed code for that aircraft. The protective jacket 63 prevents unauthorized personnel and also the representative just mentioned from determining the code for that particular aircraft by a visual inspection of the drum. When the drum 33 is inserted in the aperture 50 of the housing 48 with the lug 65 properly aligned with the notch 66 in the housing and with the groove 67 in the rod 68, the left-hand end of the drum slides over the tapered portion 43 of the spindle 42 and then engages the body portion of the spindle. As the drum is pushed further onto the spindle by means of the handle 62, the protective jacket 63 comes into engagement with the shoulder of housing 48 about the aperture and the jacket is thrust back against the cutters 53, 53. The cutters longitudinally sever the jacket and permit the drum to be pushed further onto the spindle 42. When a projecting pin 39, 38, 37 engages the tapered portion 43 of the spindle 42, the pin is thrust radially outwardly in its confining aperture. The operation of forcing the pins outwardly of the drum takes place within the housing 48 to the right of the cam shoulder 51 so that the code is not revealed. Prior to forcing the drum 33 completely within the housing 48, it may be necessary to rotate the drum slightly so that the rotatable cutters 53, 53 rest within their mating notches 52, 52 represented in Fig. 6. When the drum rests completely within the housing 48, the frictional disc 47 is in engagement with the corresponding disc 46 on the drive gear 45 so that rotation may be applied to the drum by the latter. When the drum is established in its operative position on the spindle 42, the knob 62 is rotated in a direction so as to disengage the threaded shaft 61 from the closure 54 which is retained in a fixed position in the housing 48 by means of the notches 52, 52 which confine the cutters 53, 53 and prevent rotation of the closure. The cover 87 represented in Fig. 6 for the aperture is then swung to its closed position wherein it may be locked in place by the authorized representative just mentioned so as to prevent unauthorized personnel on the aircraft from removing or tampering with the coding drum.

It will now be assumed that the drum 33 is in the housing 48 and that the aircraft has taken off and is flying over a patrol point in the North Atlantic such as one of the first wave-signal stations or beacons mounted on a patrol ship. The operator of the beacon 10 on the patrol ship will speak into his microphone 14, represented in Fig. 1, and transmit a wave-signal interrogation to the aircraft 18 in the vicinity of that ship. The beacon operator may demand that the aircraft identify itself in the usual manner. The interrogation will be received by the receiver 21 of the transponder 20 on the aircraft and this interrogation will be heard over the loudspeaker 22. The output signal of the latter effectively constitutes a control effect. In response to this control effect, the operator of the aircraft will close the switch A (or it may be done automatically by the relay 25) so as to operate the unit identified as the A coder in Fig. 1 of the drawings. The A coder develops a coded reply in conjunction with the tone-generating apparatus 27 and applies by way of the channel 28 an output signal which modulates the high-frequency wave signals developed by the transmitter 29. This wave signal is radiated by the antenna system 19 to the beacon 10 where it is intercepted by the antenna system 13 and applied to the receiver 12 which, in turn, develops for application to the loudspeaker 16 a series of tone signals established by the A coder in conjunction with the tone-generating apparatus 27. If the coded reply signal corresponds with that indicated for the particular aircraft 18 in the code book of the operator of the patrol craft, he may not require further identification since he knows of the flight plan of the aircraft and the approximate time of arrival over the region of the interrogating beacon.

A more detailed explanation of the operation of the coding apparatus 30 on the transponder 20 of the aircraft may be had by reference to Fig. 2. When the interrogation from the beacon 10 is received by the transponder 20, the operator on the aircraft depresses the push button A momentarily, thereby starting the rotation of the motor 243, the drum 33, and the disc 81. The momentary depression of the push button A causes the motor to rotate the insulating segment 82 out of engagement with the contact 84 so that the motor-energizing circuit is completed through the disc and the motor continues to rotate until the insulating segment 82 again makes engagement with the contact 84, thereby interrupting the motor circuit and stopping the motor with the contact 84 engaging the insulating segment. The dynamic braking arrangement incorporated in the motor prevents it from overrunning the insulating segment 82. As the drum 33 is rotated, any projecting pins 37, 37 which may be in each of the four rows of apertures 34, 34, depending upon the established code, are successively brought into engagement with a lower one or ones of the contact fingers 40, 40. Such a finger is deflected into engagement with an upper finger 41 and a circuit is completed between one of the oscillators and the transmitter 29 so as to apply a selected tone signal to the signal-translating channel 28 for modulating the high-frequency wave signal developed by the transmitter 29. 2500 combinations of signals are available in the A code portion of the coding apparatus and, as previously mentioned, the particular combination has been established in advance of the flight of the aircraft by authorities of the United States Government. If, for example, during one rotation of the drum 33 two lower fingers 40, 40 are successively deflected into engagement with two corresponding upper fingers 41, 41, two successive tone signals are applied to the transmitter 29 and two tone-modulated signals are radiated for interception by the antenna system 13 of the beacon 10. The received tone-modulated signals are applied to the receiver 12 which recovers the tone-modulation components thereof and applies them to the loudspeaker 16 where they are converted to two successive tone signals that are heard by the beacon operator. The pilot of the aircraft may be asked to repeat his identification, in which case he momentarily depresses the push button A to start the rotation of the motor 243, its associated drum 33, and the disc 81. The previously described cycle of operation is repeated and the motor 243 comes to rest when the insulating segment 82 again makes engagement with the contact 84. If these tone signals represent the correct code for the interrogated aircraft, the beacon operator may not require further identification.

It will now be assumed that the operator of the beacon 10 requires further identification by the pilot of the aircraft 18 carrying the transponder 20. Another voice request is transmitted by transmitter 11 of the beacon to the receiver 21 of transponder 20 on the aircraft informing the pilot that further identification is required. To accomplish this, the pilot first closes the switch B represented in Figs. 1 and 2 of the drawings. As will be seen from Fig. 2, this connects the battery 78 in circuit with the solenoid 74 through the resistor 79 and energizes the solenoid sufficiently to attract the rod 73 a predetermined distance to the right against the resistance of the spring 76 so that the contact fingers 40, 40 and 41, 41 are positioned in operative relation with reference to any contact pins 38, 38 which may be disposed in apertures 35, 35 in the B code section of the drum 33. The push-button switch A is then depressed, thereby starting the motor and the rotation of the drum as previously explained. A predetermined contact pin or pins 38, 38 on the drum 33 deflect certain of the lower contact fingers 40, 40 into momentary engagement with corresponding upper contact fingers 41, 41, thereby completing a circuit between one or more of the oscillators of the apparatus 27 and the transmitter 29. This causes the latter to radiate one or more tone-modulated signals in a manner previously explained. These tone-modulated signals correspond to the B code previously determined by Government authorities. As previously explained in connection with the radiated A code signals, the B code signals are intercepted by the antenna system 13 of the beacon 10 and are applied to the receiver 12 thereof wherein they are converted to tone signals for application to the loudspeaker 16. The beacon operator listens to these tone signals and should he determine that they are the correct tones for the B code of the interrogated aircraft, he may not require further identification.

Assuming, however, that the operator still has doubts as to the identity of the interrogated craft, he then transmits another interrogation to the aircraft requesting still furher identification. In that case, the pilot closes the switch C, thereby shunting the resistor 79 and causing a greater flow of current in the solenoid 74. This is effective to pull the rod 73 further into the solenoid and to displace the support 70 and its contact fingers to the right into an operative relation with reference to any projecting contact pins 39, 39 disposed in apertures 36, 36 in the C code portion of the drum 33. By momentarily depressing the push-button switch A, the rotation of the motor 243, the drum 33, and the disc 81 is started. This operation causes any projecting pins 39, 39 to engage corresponding lower contact fingers 40, 40 and deflect the latter into engagement with the upper contact fingers 41, 41 so as to complete a circuit between the selected one or ones of the oscillators of the generating apparatus 27 and the transmitter 29. The radiated signal is intercepted by the antenna system of the beacon 10 and applied to the receiver 12 which derives the tone signals for application to the loudspeaker. If the correct tones are developed in the proper sequence, this will indicate to the operator of the beacon that the plane is definitely a friendly one. Since 625 tone combinations are possible with reference to each of the A and B codes and a similar number may be developed in connection with the C code, the identity of 390,625 aircraft may be established by the A and B codes while the identity of 244,140,625 aircraft may be established by the A, B, and C codes. It is, therefore, very unlikely that an unfriendly craft by fortuitous circumstances would be able to radiate output signals of the correct three codes for the purpose of deceiving the operator of the beacon. If it is established that the interrogated aircraft is unable properly to identify itself, the operator of the beacon issues a warning to land-based or to carrier-based fighter planes along the northeast coast of North America. These planes are dispatched to the region of the beacon to check on the identity and the mission of the craft which was unable to supply proper identification information.

While the operation of the identification system has been explained in terms of a voice request for information, it will be clear that a request for the A code identification may be made by an automatic coding device such as the coder 15 shown in Fig. 1. In such a situation, the relay 25 in the transponder 20 in the aircraft operates the code switch A to develop an A code reply signal. However, B and C code reply signals are developed only at the election of the pilot of the aircraft upon request for such identification by the beacon operator.

Under some operating conditions, such as in time of war, it may upon occasion be desirable that the transmitters of the beacons remain silent. Under those conditions, the aircraft entering the outer defense perimeter of North America might re required to turn on its transmitter when the aircraft is a predetermined distance from that continent and thereafter at prescribed intervals transmit its A code. B and C code reply signals would only be transmitted in reply to the proper beacon interrogations. Under such conditions, the beacons would receive the signals transmitted by the aircraft and would utilize those signals in the manner previously explained in checking upon the identity of the aircraft approaching this continent. Thus, it will be seen that the identification system of the present invention has considerable flexibility as to its mode of operation under various conditions.

From the foregoing explanation of the operation of the Fig. 1 identification system, it will be seen that the pass bands of the transmitting and receiving equipment for both the beacons and transponders may be narrow. Since the modulation signals utilized in developing the coded wave-signal replies may be simple audio-frequency signals, only a very small portion of the spectrum is required for the identification purposes under consideration. Since the same low-frequency modulation signals are employed in succession and ordinarily in different sequences in accordance with the different prescribed conditions, the pass-band requirements of the equipment employed in the identification system are greatly simplified, thus enabling the equipment to be built at a low cost. Since the identification system is capable of making use of regular voice communication bands employed for radio transmission, this equipment is adapted for use with existing transmitting and receiving equipment now available on almost all aircraft flying about the United States. However, it will be understood that the system may employ coding schemes of various types such as pulse spacings, pulse widths, or any suitable type of distinctive modulation.

Referring again to the map of Fig. 8, it will be seen that the United States has been divided into zones A, B, and C. The interior zone A is one wherein all aircraft navigating thereover quite likely will respond to interrogations from beacons when they are within that zone only with the A code. Similarly, aircraft flying within the B zone may be required to respond to interrogations of the type under consideration by means of the A code and the B code in succession while aircraft flying across the C zone constituting the outer perimeter of defense may be required to respond to interrogations with replies in accordance with the A, B, and C codes in succession. For security reasons, it may be necessary to change the code-setting devices 31 in any aircraft flying in the C zone at frequent intervals such as every week or perhaps for individual flights. For reasons of security, it may be unnecessary to change the code-setting devices in aircraft flying over the A and B zones at as frequent intervals. For example, aircraft flying in the B zone might employ a code-setting device set up in accordance with a predetermined code for a period of a month after which it would be replaced by another device set up in accordance with a different code. Similarly, aircraft flying primarily in the A zone might utilize their code-setting devices for about a year before a replacement was made.

Figure 9:
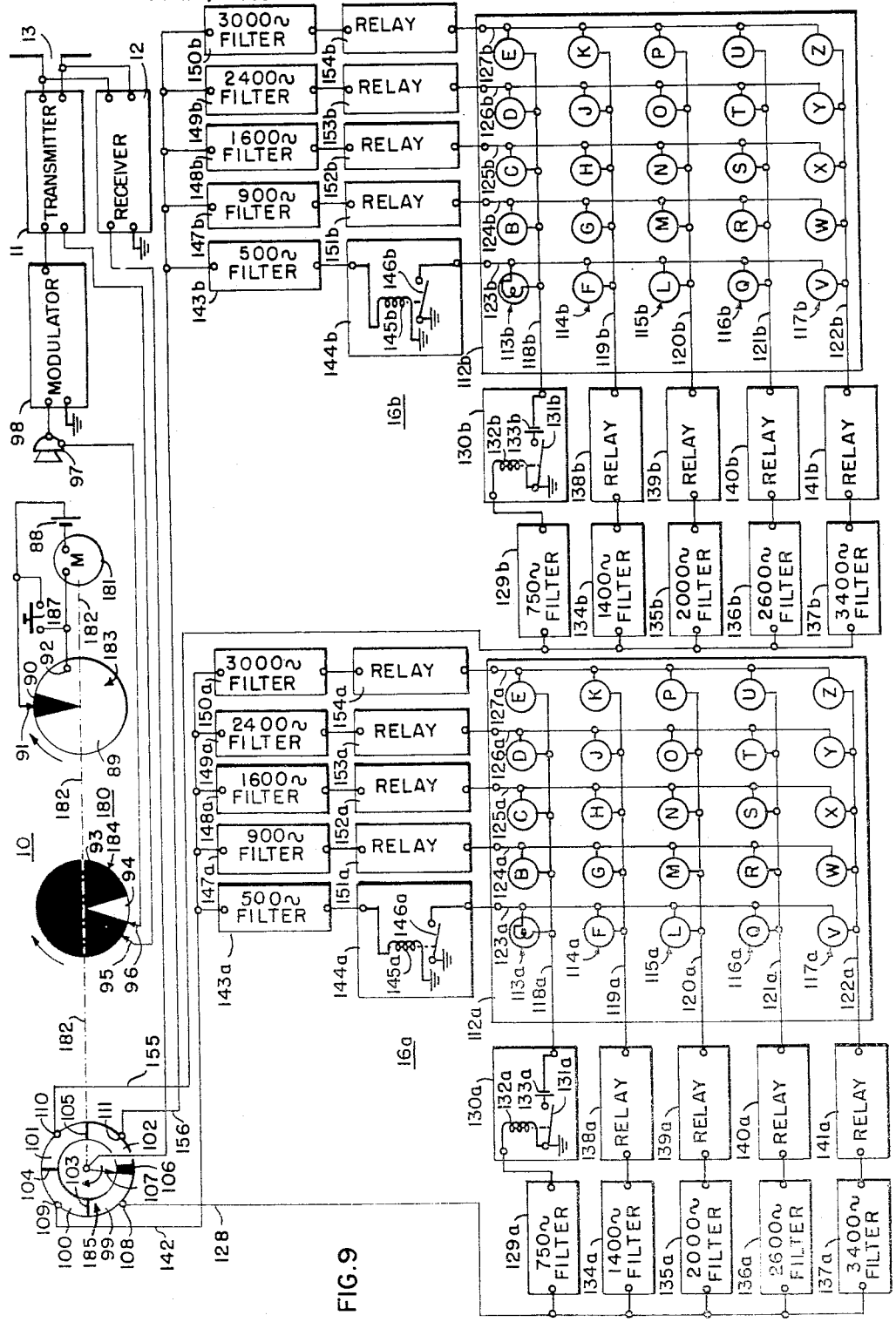
Fig. 9 is a schematic representation of another wave-signal beacon or interrogator-responser.

Description of identification system of Figs. 9 and 10

Figs. 9 and 10, taken together, represent an identification system which is a modification of that represented in Fig. 1 and its related subsequent figures. The system of Figs. 9 and 10 is generally similar to that of Fig. 1 and its related figures but differs therefrom primarily in that it is effective to provide a visible display of the coded reply signal or signals from the transponder on the aircraft rather than to produce an audible indication as provided by the beacon of Fig. 1. Corresponding elements of the Figs. 9 and 10 system are designated by the same reference numerals that are employed for the same elements in the system of Fig. 1 and related subsequent figures.

Fig. 9 represents schematically the first wave-signal station or beacon 10 while Fig. 10 represents the second wave-signal station or transponder 20 carried by the aircraft. The first wave-signal station or beacon 10 of Fig. 9 includes a transmitter 11 and a first cyclically operated control means 180 therefor for developing modulation signals for the signal transmitter. The control means 180 includes a motor 181 for driving by means of a common shaft 182 two control discs 183 and 184 and a rotary contact 107 associated with a ring-shaped disc 185. Initiation of the operation of the motor 181 is effected by depressing the push-button switch 187 which supplies energy to the motor from a source represented as a battery 88. The disc 183 has a large conductive segment 89 and a smaller insulating segment 90 which are adapted to be connected through electrical contacts 91 and 92 and suitable conductors to the terminals of the push-button switch 187. The disc 184 has a large insulating segment 93 and a smaller conductive segment 94. A pair of electrical contacts 95 and 96 having a spacing somewhat less than the arc of the conductive segment 94 are arranged to engage the periphery of the disc 184. The contact 95 is connected to one of the input terminals of the transmitter 11 while contact 96 is connected to the other terminal thereof through a microphone 97 and a modulator 98.

The disc 185 has four conductive segments 99, 100, 101, and 102 separated from adjoining segments by smaller insulating segments 103–106, inclusive. Segment 106 is somewhat larger than the other insulating segments for a purpose which will be explained subsequently. The rotary electrical contact 107 makes engagement with the inner circumference of the disc 185 and terminals 108, 109, 110, and 111 engage individual ones of the segments 99–102 as represented. Rotary contact 107 is connected to the output circuit of the receiver 12. The terminals 108–111 are connected to units to be described hereinafter.

The first wave-signal station or beacon 10 also includes display means having selector means responsive to the coded replies from the second wave-signal station or transponder 20 represented in Fig. 10 for providing a visual indication of those replies. This display means comprises a first display apparatus 16a and a second apparatus 16b of identical construction. Accordingly, a description of one apparatus will suffice for the other. Corresponding elements of the apparatus 16a and 16b are designated by the same reference numerals but with the suffixes "a" and "b" employed to distinguish those elements. Apparatus 16a includes a display board 112a comprising five horizontal rows of lamps 113a–117a, inclusive, each row having five lamps. Individual ones of these lamps when illuminated is effective to display individual letters of the alphabet, the letter I being omitted, however. A filament is represented in the drawing for the first lamp instead of the letter A to facilitate the explanation of the operation of the display board 112a. The lamps of the horizontal row 113a have a common bus 118a connected to one terminal of each lamp in that row and, similarly, rows 114a–117a have their individual busses 119a–122a, inclusive. Similarly, individual vertical rows of lamps have their individual busses 123a–127a which are connected to the other terminals of the various lamps.

The terminal 108 on the disc 185 is connected through a conductor 128, a frequency-selective means in the form of a 750-cycle translating filter 129a, a relay 130a, containing a switch 131a which is normally open but is closed when a relay winding 132a is energized, and a battery 133a, and through the bus 118a to each of the lamps in row 113a. Similarly, the conductor 128 is coupled to individual ones of busses 119a–122a through translating filter 134a–137a and relays 138a–141a as represented. The filters 134a–137a are adapted to select and translate the frequency components indicated on the drawing.

Terminal 109 is coupled through a conductor 142 and a 500-cycle filter 143a to a winding 145a which, when energized, closes a normally open switch 146a having one of its terminals grounded and the other thereof connected to the bus 123a. Similarly, the conductor 142 is coupled to individual ones of the busses 124a–127a through frequency-selective translating filters 147a–150a and relays 151a–154a as represented. The filters 147a–150a are adapted to select and translate the frequencies indicated on the drawing. The terminals 110 and 111 are coupled through conductors 155 and 156 to the various busses of the display board 112b in the same manner that the conductors 128 and 142 are coupled to the corresponding busses of the display board 112a.

The second wave-signal translating station or transponder 20 of Fig. 10 is substantially the same as that represented in Fig. 2 but differs therefrom in that ten oscillators 160–169, inclusive, are employed to produce the various tone signals indicated in the drawing, which tones correspond in frequency to those of the selective filters of Fig. 9. The oscillators just mentioned are connected in a conventional manner to the upper contact fingers 41, 41 associated with lower contact fingers 40, 40 on the movable support 70. The A code section of the drum 33 of Fig. 10 contains four longitudinal rows of apertures, the rows being disposed in quadrature relation and each containing five apertures. The apertures in alternate rows are staggered axially in the manner indicated in Fig. 10. The B and C code sections of the drum 33 have patterns which correspond exactly with that of the A code section.

In addition to being coupled to the A decoder, the output circuit of the receiver 21 is also coupled to a utilizing device such as the loudspeaker 16. It may also be coupled through the switch 23 to the relay winding 24 of relay 25 which may control the normally open manually operable switch A. The normally open switches B and C are connected as are the corresponding switches in the Fig. 2 circuit.

*Explanation of operation of system of Figs. 9 and 10*

To interrogate a nearby aircraft to determine whether it is friendly or unfriendly, the operator of the beacon 10 of Fig. 9 first momentarily depresses the push-button switch 187 so as to energize the motor 181. This causes the discs 183 and 184 and also the contact 107 to rotate. The rotation of disc 183 causes the contact 91 to make engagement with the conductive segment 89, thereby maintaining the motor 181 in an energized condition until the insulating segment 90 again engages the contact 91 and shuts off the motor. Rotation of the disc 184 in the direction indicated in the drawing causes the conductive segment 94 to span the contacts 95 and 96, thereby completing a circuit whereby the operator of the beacon 10 may speak into the microphone 97 and request that the aircraft identify itself with its A code. A radio-frequency interrogating signal is radiated by the antenna system 13 to the transponder 20 carried by the aircraft.

The interrogation signal is intercepted by the antenna system 19 of the transponder 20 of Fig. 10 and is applied to the receiver 21 which derives the modulation components of the received signal and applies them to the loudspeaker 16. Assuming switch 23 is open, the pilot in response to the request for his A code identification closes switch A, thereby completing the energization circuit of the motor 243 which then begins to rotate and drive the disc 81 and the drum 33 of the code-setting device 31. Since the wave-signal propagation time between the beacon 10 of Fig. 9 and the transponder 20 of Fig. 10 is extremely small, the motor 243 begins to rotate substantially simultaneously with the rotation of the motor 181 of the beacon 10. The motor rotation turns disc 81 and brings the contact 84 into engagement with the conductive segment 83, thereby shunting the switch A thereof which remains closed until such time as the insulating segment 82 again makes engagement with the contact 84 after which the motor stops.

The drum 33 of the code-setting device 31 makes a complete rotation for each rotation of the drum and causes the pins 37, 37 which project beyond the outer surface of the drum to close certain of the contact fingers 40, 41, thereby completing an electrical circuit between selected ones of the oscillators 160–169, inclusive, and tranmitter 29. As the drum rotates, a projecting pin in the upper longitudinal row of apertures first makes engagement with a lower contact finger 40 followed by a similar engagement by a pin in the next row of apertures displaced 90° with reference to the upper row of apertures. During the interval the pin in the upper row of apertures is in engagement with a contact finger 40, the contact 107 of the control means 180 of the Fig. 9 beacon has rotated through an angle such that the contact 107 is in engagement with the conductive segment 99 of disc 185 so that an electrical circuit is completed between the output circuit of the receiver and the conductor 128 for a purpose to be explained subsequently. Similarly, during the interval that a pin 37 of the Fig. 10 code-setting device 31 in the next row of apertures positioned in quadrature relation to the first row of apertures is in engagement with a contact finger 40, the contact 107 has been rotated through an angle such that it is now in engagement with the conductive segment 100 so that an electrical circuit is completed between the output circuit of the receiver and the conductor 142. Likewise, when the drum 33 of Fig. 10 has rotated sufficiently to place any of its pins 37, 37 in the third and fourth quadrants thereof in engagement with a contact finger 40, the contact 107 of Fig. 9 has rotated to its third and then its fourth quadrant positions so that the contact 107 engages in succession the conductive segments 101 and 102, thereby connecting the conductors 155 and 156 successively in circuit with the output circuit of the receiver. For the purpose of this explanation, it will be assumed that the correct A code signals are received from the transponder 20 of Fig. 10 when the lamp A of the display board 112a of Fig. 9 is first illuminated followed by the illumination of the lamp B of display board 112b. To effect such a display, the pins of the drum 33 of Fig. 10 are so disposed in the apertures 34, 34 that the 750-cycle oscillator 160 is first connected to the transmitter 29 so that a short time later, when the second row of apertures lies beneath the contact fingers of support 70, a 500-cycle tone is translated to the modulation-signal input of the transmitter 29. Similarly, the third and fourth rows of pins are so disposed in the apertures of the drum as to make proper engagement with contact fingers so as to translate to the transmitter 29 a 750-cycle tone followed by a 900-cycle tone. This in effect means that of the multitude of tone combinations posible for the A code, the particular A code for the aircraft in flight comprises a 750-cycle tone followed by a 500-cycle tone which, in turn, are followed by a 750-cycle tone and a 900-cycle tone.

The tone-modulated signals radiated by the transmitter 29 of the transponder 20 are received by the receiver 12 of the beacon 10. A circuit is first completed between the receiver and the relay winding 132a during the interval of the first 750-cycle tone signal being received by way of the conductor between the receiver output circuit and the contact 107 which is then in engagement with the conductive segment 99, the contact 108, the conductor 128, and the filter 129a. Since the filter 129a is tuned to the 750-cycle tone, it is effective to translate the output signal of the receiver to the winding 132a of relay 130a, thereby energizing the winding, closing the switch 131a, and connecting the battery 133a between ground and the bus 118a connected to the first horizontal row of lamps 113a. The winding 132a retains the energy translated thereto for a predetermined interval of time so that the switch 131a is not released instantly. Since the filters 134a–137a do not respond to the 750-cycle tone signal then being applied to conductor 128, the windings of the relays 138a–141a are not energized. Consequently, the reception of the 750-cycle tone signal is effective to connect one terminal of a battery such as the battery 133a only to the bus 118a connected to one terminal of the lamps of the first row which when the circuit is completed to one of the other terminals thereof will light and illuminate one of the letters A, B, C, D, and E.

A moment later when the 500-cycle tone signal is being received and the contact 107 is in engagement with the conductive segment 100 of the disc 185, a circuit is completed between the receiver 12 and the relay winding 145a through the conductor 142 and the 500-cycle filter 143a. The 500-cycle filter translates the 500-cycle tone and develops a control effect which energizes the winding 145a, thereby closing the switch 146a for an interval of time. This, in turn, completes the circuit between the battery 133a and the first lamp so that it is illuminated and flashes the letter A. After an interval of time, the A light is extinguished when the switches 131a and 146a of the relays 130a and 144a, respectively, open. A moment later the third or 750-cycle tone signal is received and the rotary contact 107 is in engagement with conductive segment 101, thus completing through the conductor 155 a circuit between the output terminals of the receiver 12 and the 750-cycle filter 129b of terminal board 112b. In the manner previously explained with respect to the terminal board 112a, the lamp B of board 112b is conditioned to be illuminated when a succeeding 900-cycle tone is received a moment later. During the moment just mentioned, the rotary contact 107 is in engagement with the conductive segment 102 and a circuit is completed through conductor 156 to the relay 151b for the 900-cycle tone then being received. Lamp B of terminal board 112b is illuminated for a short interval of time, thus informing the operator of the beacon 10 that the transponder 20 is replying with the correct A code.

If it becomes necessary to request that the aircraft repeat its A code, the push-button switch 187 is again depressed and the cycle of operation just described is repeated so that the A and B lamps of boards 112a and 112b, respectively, again flash the information. The other lamps of the display board 112a are not affected by the 750-, 500-, and 900-cycle tone signals because of the frequency-selective characteristics of the various filters connected between the conductors 128 and 142 and the various relays. If the A code for the interrogated aircraft happened to include a 3400-cycle tone followed by a 3000-cycle tone, the relays 141a and 154a would have been operated in succession so that the Z lamp was illuminated. In a similar manner, the other lamps of the display board may be illuminated for other tone combinations.

It will now be assumed that the operator of the beacon 10 requires further identification of the aircraft being interrogated. Depression of the push-button switch 187 causes the motor 181 to rotate as previously explained and the engagement of contacts 95 and 96 with the conductive segment 94 of the disc 184 is effective to connect the microphone 97 and the modulator 98 in circuit with the input circuit of the transmitter 11. A request spoken into the microphone 97 for the pilot to identify himself by his B code is radiated by the transmitter 11 and is intercepted by the antenna system 19 coupled to the receiver 21 of the transponder 20. Upon hearing this request over the loudspeaker 16, the pilot closes the switch B. The solenoid 74 is energized to shift the support 70 and its contact fingers to the B code position, whereupon the pilot closes the A switch and the motor 243 starts its rotation. The rotation of the drum 33 of the code-setting device 31 causes four successive tone signals to be developed in accordance with the pre-established code. For convenience it will be assumed that, in the manner explained above, the first two tone signals are selected by the proper ones of the filters 129a, 134a–137a and 143a, 147a–150a and cause the proper ones of the relays 130a, 138a–141a and 144a, 151a–154a to complete an electrical circuit, whereby the selected one of the lamps of the display board 112a is illuminated. Similarly, the next pair of tone signals are effective to cause the illumination of the proper lamp of the display board 112b. The illumination of these two lamps reveals to the operator of the beacon 10 the B code information transmitted by the transponder and thus serves more fully to identify the interrogated aircraft.

If the operator of the beacon feels that full identification of the aircraft is necessary, the motor 181 of the beacon 10 is started by closing switch 187 and a request is made into the microphone 97 for an identification of the aircraft by its C code. The radio-frequency interrogating signal is transmitted by the transmitter 11 and is received by the receiver 21 on the aircraft which recovers the modulation components and applies them to the loudspeaker 16. In response to the request, the pilot closes both the switch B and the switch C, thereby short-circuiting the resistor 79 and applying energy to the solenoid 74. As a result, the solenoid 74 receives sufficient current to move the support 70 and its contact fingers to the C code position over the drum 33. Shortly after this has happened, the pilot closes the switch A and starts the operation of the motor 243. Four successive tone signals in accordance with the established C code are developed and modulate the output signal of the transmitter 29 in the manner previously explained. A coded reply signal is radiated by the antenna system 19 of the transmitter 29 and is intercepted by the antenna system 13 of the beacon 10. The received signal is applied to the receiver 12 which develops the tone signals for application by the rotary contact 107 to the proper ones of the conductors 128, 142, 155, and 156 in the order mentioned. The first pair of tone signals are selected by the proper ones of the filters 129a, 134a–137a and 143a, 147a–150a and are applied to the proper ones of the relays which, in turn, are effective to cause the energization of a selected one of the lamps of the display board 112a. Similarly, the next pair of tone signals are applied through the proper coders and relays associated with the display board 112b, thereby causing the illumination of one of the lamps of that display board. The illuminated information on the two display boards represents the C code of the interrogated aircraft and serves fully to identify the craft as being friendly.

The coded reply signals received by the beacon 10, instead of being applied to the display apparatus 16a and 16b represented in Fig. 9 of the drawings, may be fed into an automatic digital computer (not shown) and matched against coded signals previously inserted into the memory system of the computer. The computer will then supply information as to whether the interrogated aircraft is friendly or hostile.

From the foregoing description it will be clear that the identification system not only provides a rapid positive identification of aircraft flying over critical and non-critical areas of the country but also has a very high degree of security. This security is enhanced because of the very large number of code combinations which may be developed for the various aircraft by the relatively tamper-proof code-setting device which makes it extremely difficult for unauthorized personnel to determine the established code by inspection and study of that device.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A code-setting device for an electrical identification system comprising: a drum having a plurality of approximately radially disposed apertures extending through the wall thereof and arranged in a predetermined pattern; and at least one member adapted to be confined by frictional surface engagement in any one of said apertures selected in accordance with a predetermined code, said member having a length greater than the thickness of said wall and a width throughout said length substantially equal to the width of any one of said apertures.

2. A code-setting device for an electrical identification system comprising: a drum having a plurality of approximately radially disposed apertures extending through the wall thereof and arranged in a plurality of longitudinally extending patterns; and at least one member for each of said patterns adapted to be confined by frictional surface engagement in any one of said apertures of individual ones of said patterns, which aperture is selected in accordance with a predetermined code, said member having a length greater than the thickness of said wall and a width throughout said length substantially equal to the width of any one of said apertures.

3. A code-setting device for an electrical identification system comprising: a drum having a plurality of approximately radially disposed apertures extending through the wall thereof and arranged in a plurality of longitudinally extending patterns; and a corresponding plurality of members adapted to be confined by frictional surface engagement in predetermined ones of said apertures selected in accordance with a corresponding plurality of predetermined codes, said members having a length greater than the thickness of said wall and a width throughout said length substantially equal to the width of any one of said apertures.

4. A code-setting device for an electrical identification system comprising: a cylindrical drum having a plurality of approximately radially disposed apertures extending through the wall thereof and arranged in a predetermined pattern; and at least one member adapted to be confined by frictional surface engagement in any one of said apertures selected in accordance with a predetermined code, said member having a length greater than the thickness of said wall and a width throughout said length substantially equal to the width of any one of said apertures.

5. A code-setting device for an electrical identification system comprising: a drum having a plurality of approximately radially disposed apertures extending through the wall thereof and arranged in a predetermined pattern; at least one member confined by frictional surface engagement in any one of said apertures selected in accordance with a predetermined code, said member having a length greater than the thickness of said wall and a width throughout said length substantially equal to the width of any one of said apertures; and a protective jacket of opaque material in intimate contiguous relation with the outer periphery of said drum for concealing said pattern and said code until removed from said drum.

6. A code-setting device for an electrical identification system comprising: a drum having a plurality of approximately radially disposed apertures extending through the wall thereof and arranged in a predetermined pattern; at least one member adapted to be confined by frictional surface engagement in any one of said apertures selected in accordance with a predetermined code, said member having a length greater than the thickness of said wall and a width throughout said length substantially equal to the width of any one of said apertures; a removable protective jacket of opaque material secured to the outer periphery of said drum for concealing said pattern and said code until removed from said drum; and a cutter secured to one end of said drum for cutting said jacket from said drum.

7. A code-setting device for an electrical identification system comprising: a drum having a plurality of approximately radially disposed apertures extending through the wall thereof and arranged in a predetermined pattern; at least one member adapted to be confined by frictional surface engagement in any one of said apertures selected in accordance with a predetermined code, said member having a length greater than the thickness of said wall and a width throughout said length substantially equal to the width of any one of said apertures; a removable protective jacket of relatively stiff opaque material secured to the outer periphery of said drum for concealing said pattern and said code until removed from said drum; a closure secured to one end of said drum and including a cutter for cutting said jacket from said drum; and a handle detachably secured to said closure.

8. A code-setting device for an electrical identification system comprising: a drum having a plurality of approximately radially disposed apertures extending through the wall thereof and arranged in a predetermined pattern; at least one member adapted to be confined by frictional surface engagement in any one of said apertures selected in accordance with a predetermined code, said member having a length greater than the thickness of said wall and a width throughout said length substantially equal to the width of any one of said apertures with one end of said member lying in an inoperative position below the outer surface of said drum and the other end thereof extending beyond the inner surface of said drum; and means shaped for insertion axially within said drum into engagement with said other end of said member to displace said one end thereof beyond the outer surface of said drum into an operative position.

9. A code-setting device for an electrical identification system comprising: a drum having a plurality of approximately radially disposed apertures extending through the wall thereof and arranged in a predetermined pattern; at least one member adapted to be confined by frictional surface engagement in any one of said apertures selected in accordance with a predetermined code, said member having a length greater than the thickness of said wall and a width throughout said length substantially equal to the width of any one of said apertures with one end of said member lying in an inoperative position below the outer surface of said drum and the other end thereof extending beyond the inner surface of said drum; and cylindrical means having a tapered free end shaped for insertion axially within said drum into engagement with said other end of said member to push said one end thereof beyond the outer surface of said drum into an operative position.

10. A code-setting device for an electrical identification system comprising: a drum having a plurality of approximately radially disposed apertures extending through the wall thereof and arranged in a predetermined pattern; at least one member adapted to be confined by frictional surface engagement in any one of said apertures selected in accordance with a predetermined code, said member having a length greater than the thickness of said wall and a width throughout said length substantially equal to the width of any one of said apertures with one end of said member lying in an inoperative position below the outer surface of said drum and the other end thereof extending beyond the inner surface of said drum; and rotatable means shaped for insertion axially within said drum into engagement with said other end of said member to push said one end thereof beyond the outer surface of said drum into an operative position and to rotatably support said drum.

11. A code-setting device for an electrical identification system comprising: a drum having a plurality of approximately radially disposed apertures extending through the wall thereof and arranged in a predetermined pattern; at least one member adapted to be confined by frictional surface engagement in any one of said apertures selected in accordance with a predetermined code, said member having a length greater than the thickness of said wall and a width throughout said length substantially equal to the width of any one of said apertures with one end of said member lying in an inoperative position below the outer surface of said drum and the other end thereof extending beyond the inner surface of said drum; a housing having an opening therein for admitting said drum when said member is in said inoperative position; means within said housing at said opening shaped for insertion axially within said drum into engagement with said other end of said member to push said one end thereof beyond the outer surface of said drum into an operative position when said drum is inserted through said opening into said housing; and means on said housing adjacent said opening for pushing said member into said inoperative position when said drum is withdrawn from said housing.

12. A code-setting device for an electrical identification system comprising: a drum having a plurality of approximately radially disposed apertures extending through the wall thereof and arranged in a predetermined pattern; at least one member adapted to be confined by frictional surface engagement in any one of said apertures selected in accordance with a predetermined code, said member having a length greater than the thickness of said wall and a width throughout said length substantially equal to the width of any one of said apertures with one end of said member lying in an inoperative position below the outer surface of said drum and the other end thereof extending beyond the inner surface of said drum; means shaped for insertion axially within said drum into engagement with said other end of said member to push said one end thereof beyond the outer surface of said drum into an operative position; means for rotating said drum with said member in said operative position; and circuit control means for engagement with said member in said operative position.

13. A code-setting device for an electrical identification system comprising: a drum having a plurality of approximately radially disposed apertures extending through the wall thereof and arranged in a predetermined pattern; at least one member adapted to be confined by frictional surface engagement in any one of said apertures selected in accordance with a predetermined code, said member having a length greater than the thickness of said wall and a width throughout said length substantially equal to the width of any one of said apertures with one end of said member lying in an inoperative position below the outer surface of said drum and the other end thereof extending beyond the inner surface of said drum; means shaped for insertion axially within said drum into engagement with said other end of said member to push said one end thereof beyond the outer surface of said drum into an operative position; means for rotating said drum with said member in said operative position; and circuit control means adjustable axially of said drum for engagement with said member in said operative position.

14. A code-setting device for an electrical identification system comprising: a drum having a plurality of approximately radially disposed apertures extending through the wall thereof and arranged in a plurality of predetermined patterns; a corresponding plurality of members adapted to be confined by frictional surface engagement in predetermined ones of said apertures selected in accordance with a corresponding plurality of predetermined codes, each of said members having a length greater than the thickness of said ball and a width throughout said length substantially equal to the width of any one of said apertures with one end of said member lying in an inoperative position below the outer surface of said drum and the other end thereof extending beyond the inner surface of said drum; means shaped for insertion axially within said drum into engagement with said other ends of said members to push said one ends thereof beyond the outer surface of said drum into operative positions; means for rotating said drum with said members in said operative positions; and circuit control means selectively adjustable axially of said drum to individual ones of a corresponding plurality of different positions for engagement with said members in said operative positions.

15. A code-setting device for an electrical identification system comprising: a drum having a plurality of approximately radially disposed apertures extending through the wall thereof and arranged in a plurality of predetermined patterns; a corresponding plurality of members adapted to be confined by frictional surface engagement in predetermined ones of said apertures selected in accordance with a corresponding plurality of predetermined codes, each of said members having a length greater than the thickness of said wall and a width throughout said length substantially equal to the width of any one of said apertures with one end of said member lying in an inoperative position below the outer surface of said drum and the other end thereof extending beyond the inner surface of said drum; means shaped for insertion axially within said drum into engagement with said other ends of said members to push said one ends thereof beyond the outer surface of said drum into operative positions; means for rotating said drum with said members in said operative positions; and circuit control means including a plurality of electrical contact fingers and a support therefor adjustable axially of said drum to individual ones of a corresponding plurality of different positions for engagement with said members in said operative positions.

16. A code-setting device for an electrical identification system comprising: a drum having a plurality of approximately radially disposed apertures extending through the wall thereof and arranged in a plurality of predetermined patterns; a corresponding plurality of members adapted to be confined by frictional surface engagement in predetermined ones of said apertures selected in accordance with a corresponding plurality of predetermined codes, each of said members having a length greater than the thickness of said wall and a width throughout said length substantially equal to the width of any one of said apertures with one end of said member lying in an inoperative position below the outer surface of said drum and the other end thereof extending beyond the inner surface of said drum; a housing having an opening therein for admitting said drum when said members are in said inoperative positions; a removable protective jacket of opaque material secured to the outer periphery of said drum for concealing said patterns and said codes until removed from said drum; a cutter secured to one end of said drum for cooperating with said housing to cut said jacket from said drum as the latter is inserted in said opening in said housing; means within said housing at said opening shaped for insertion axially within said drum into engagement with said other ends of said members to push said one ends thereof beyond the outer surface of said drum into operative positions; means for rotating said drum with said members in said operative positions; and circuit control means including a plurality of electrical contact fingers and a support therefor adjustable axially of said drum to individual ones of a corresponding plurality of different positions for engagement with said members in said operative positions.

17. In a code-setting device for an electrical identification system, a drum having a plurality of approximately radially disposed apertures extending through the wall thereof and arranged in a predetermined pattern; and a closure secured to one end of said drum and including a cutter extending beyond the outer periphery of said drum.

18. In a code-setting device, a drum having a plurality of approximately radially disposed apertures extending through the wall thereof and arranged in a predetermined pattern; a closure including aligning means at one end of said drum and rotatably mounted thereon; and a fixed aligning means on said drum.

19. In a code-setting device, a drum having a plurality of approximately radially disposed apertures extending through the wall thereof and arranged in a predetermined pattern; means on said drum for applying a rotational force thereto; a closure on one end of said drum and rotatably mounted thereon and including a cutter extending beyond the outer periphery of said drum; and aligning means on said drum.

References Cited in the file of this patent

UNITED STATES PATENTS

| | | |
|---|---|---|
| Re. 8,158 | Yale | Apr. 2, 1878 |
| 1,144,870 | Sohm | June 29, 1915 |
| 1,707,909 | Gullong | Apr. 2, 1929 |
| 2,247,942 | De Koevend | July 1, 1941 |